US012453479B2

(12) United States Patent
Rhee et al.

(10) Patent No.: US 12,453,479 B2
(45) Date of Patent: Oct. 28, 2025

(54) ELECTRONIC DEVICE AND METHOD OF ESTIMATING HUMAN BODY MICROCLIMATE TEMPERATURE USING THE SAME

(71) Applicant: SAMSUNG ELECTRONICS CO., LTD., Suwon-si (KR)

(72) Inventors: Hong Soon Rhee, Suwon-si (KR); Sang Kyu Kim, Suwon-si (KR); So Young Lee, Suwon-si (KR); Bok Soon Kwon, Suwon-si (KR); Sungho Kim, Suwon-si (KR); Ho Taik Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 18/132,657

(22) Filed: Apr. 10, 2023

(65) Prior Publication Data

US 2024/0215833 A1 Jul. 4, 2024

(30) Foreign Application Priority Data

Dec. 28, 2022 (KR) .......................... 10-2022-0187552

(51) Int. Cl.
*A61B 5/01* (2006.01)
*A61B 5/00* (2006.01)
*G01K 13/20* (2021.01)

(52) U.S. Cl.
CPC .............. *A61B 5/01* (2013.01); *A61B 5/4812* (2013.01); *A61B 5/681* (2013.01); *G01K 13/20* (2021.01);

(Continued)

(58) Field of Classification Search
CPC ... A61B 5/01; A61B 2562/0271; G01K 13/20
See application file for complete search history.

(56) References Cited

U.S. PATENT DOCUMENTS

| 10,503,125 B2 | 12/2019 | Germiquet et al. |
| 10,856,741 B2 | 12/2020 | Damania et al. |

(Continued)

FOREIGN PATENT DOCUMENTS

| CN | 202497138 U | 10/2012 |
| CN | 108253594 A | 7/2018 |

(Continued)

OTHER PUBLICATIONS

Communication dated Nov. 6, 2023 issued by the European Patent Office in counterpart European Application No. 23173853.5.

*Primary Examiner* — Tammie K Marlen
(74) *Attorney, Agent, or Firm* — Sughrue Mion, PLLC

(57) ABSTRACT

An electronic device for estimating human body microclimate temperature is provided. The electronic device may include: a main body; a first temperature sensor configured to measure a first temperature and a second temperature sensor configured to measure a second temperature, the first and second temperature sensors being disposed at different positions in the main body; and a processor, which while the main body is worn on a body part of a user or is carried by the user, is configured to estimate human body microclimate temperature of the user based on a difference between the first temperature and the second temperature.

12 Claims, 17 Drawing Sheets

(52) U.S. Cl.
 CPC ... *A61B 2562/0271* (2013.01); *A61B 2562/04* (2013.01)

(56) References Cited

U.S. PATENT DOCUMENTS

| | | |
|---|---|---|
| 2017/0311812 A1 | 11/2017 | Husheer |
| 2020/0186764 A1 | 6/2020 | Wozniak et al. |
| 2023/0046169 A1* | 2/2023 | Garcia Molina .... A61B 5/4812 |

FOREIGN PATENT DOCUMENTS

| | | |
|---|---|---|
| CN | 111043732 A | 4/2020 |
| CN | 112461373 A | 3/2021 |
| CN | 112504507 A | 3/2021 |
| CN | 114322230 A | 4/2022 |
| JP | 5534662 B2 | 7/2014 |
| WO | 2020/117574 A1 | 6/2020 |

\* cited by examiner

ELECTRONIC DEVICE AND METHOD OF ESTIMATING HUMAN BODY MICROCLIMATE TEMPERATURE USING THE SAME

CROSS-REFERENCE TO RELATED APPLICATION(S)

This application claims priority from Korean Patent Application No. 10-2022-0187552, filed on Dec. 28, 2022, in the Korean Intellectual Property Office, the disclosure of which is incorporated herein by reference in its entirety.

BACKGROUND

1. Field

Apparatuses and methods consistent with example embodiments relate to human body microclimate temperature using an electronic device.

2. Description of the Related Art

Temperature sensors are classified into contact temperature sensors and non-contact temperature sensors. When it comes to measuring atmospheric temperature in an electronic device, a temperature sensor is usually placed outside the electronic device to measure air temperature. However, this method has disadvantages in terms of waterproof properties and design. Accordingly, there is an increasing preference for sensors capable of measuring temperature while being embedded in the electronic device.

Temperature information provided by an existing electronic device is limited to climate temperature based on weather information, skin temperature measured by a temperature sensor in the device, or ambient temperature or indoor temperature surrounding the device. However, these temperatures do not accurately reflect the user's thermal preference or thermal sensation accurately. Accordingly, there is a need to estimate temperature by reflecting the user's thermal sensation or thermal preference, and to provide customized health services based on the estimation.

SUMMARY

According to an aspect of the present disclosure, an electronic device may include: a main body comprising a first temperature sensor configured to measure a first temperature, and a second temperature sensor configured to measure a second temperature; and a processor configured to, which while the main body is worn on a user or is carried by the user, estimate human body microclimate temperature of the user based on a difference between the first temperature and the second temperature.

The processor may be further configured to estimate heat flux based on the difference between the first temperature and the second temperature.

The processor may be further configured to: determine a first correction factor based on the first temperature at a first distance from a contact surface of the main body and the second temperature at a second distance from the contact surface; and estimate the human body microclimate temperature by obtaining a corrected heat flux by applying the first correction factor to the estimated heat flux, and combining the corrected heat flux with the second temperature.

The processor may be further configured to determine the first correction factor to be a value between the first temperature and the second temperature.

The electronic device may further include a first thermally insulating material disposed between the first temperature sensor and the second temperature sensor, and a second thermally insulating material disposed between the second temperature sensor and a surface of the main body, wherein the processor may be further configured to: calculate a second correction factor based on a resistance value of the first thermally insulating material and a resistance value of the second thermally insulating material; calculate a third correction factor based on the resistance value of the first thermally insulating material, the resistance value of the second thermally insulating material, and an air resistance value of an upper surface of the main body; and determine the value of the first correction factor to be between the second correction factor and the third correction factor.

The first temperature sensor may be disposed at a vertical distance of 10 mm or less from a lower surface of the main body.

The second temperature sensor may be disposed at a vertical distance of 10 mm or less below an upper surface of the main body.

The first temperature may be a temperature of the contact surface of the main body, and the second temperature may be a temperature at a vertical distance in a range of from 3 cm to 4 cm above the contact surface of the main body.

At least one of the first temperature sensor and the second temperature sensor may be a contact type temperature sensor.

The processor may be further configured to: determine a sleep state of the user based on data obtained by at least one of a photoplethysmography (PPG) sensor, an acceleration sensor, a illuminance sensor, and a gyro sensor; and determine a sleep environment based on the human body microclimate temperature measured during sleep.

The processor may be further configured to output a result of the determined sleep environment through an output interface.

According to another aspect of the present disclosure, a method of estimating human body microclimate temperature by an electronic device, may include: by a first temperature sensor included in a main body of the electronic device, measuring a first temperature; by a second temperature sensor disposed in the main body at a different position from the first temperature sensor, measuring a second temperature; and estimating human body microclimate temperature of a user based on a difference between the first temperature and the second temperature.

The estimating of the human body microclimate temperature may include estimating heat flux based on the difference between the first temperature and the second temperature.

The estimating of the human body microclimate temperature may include: determining a first correction factor based on the first temperature at a first distance from a contact surface of the main body and the second temperature at a second distance from the contact surface; and estimating the human body microclimate temperature by obtaining a corrected heat flux by applying the first correction factor to the estimated heat flux, and combining the corrected heat flux with the second temperature.

The estimating of the human body microclimate temperature may include determining the first correction factor to be a value between the first temperature and the second temperature.

The method may include: determining a sleep state of the user based on data obtained by at least one of a photoplethysmography (PPG) sensor, an acceleration sensor, a illuminance sensor, and a gyro sensor; and in response to determining that the user is asleep, determining a sleep environment based on the human body microclimate temperature measured during sleep.

The method may further include outputting a result of the determined sleep environment through an output interface.

According to another aspect of the present disclosure, a smartwatch may include: a main body; a strap connected to the main body; a first temperature sensor and a second temperature sensor which are disposed at different positions in the main body to measure a first temperature and a second temperature, respectively; and a processor, which while the strap is wrapped around a wrist and the main body is worn on the wrist, is configured to estimate human body microclimate temperature of a user based on a difference between the first temperature and the second temperature, and control a target temperature of an Internet of Things (IOT) device based on the estimated human body microclimate temperature.

The smartwatch may further include a communication interface configured to transmit a control signal for controlling the target temperature of the IoT device, and to receive a current ambient temperature from the IoT device.

The processor may be further configured to estimate heat flux based on the difference between the first temperature and the second temperature.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
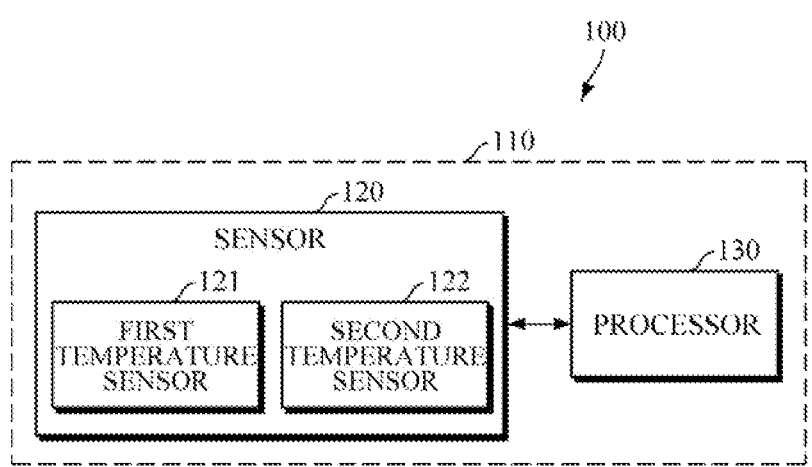
FIG. 1 is a block diagram illustrating an electronic device according to an embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit that performs at least one function or operation and that may be embodied as hardware, software, or a combination thereof.

An electronic device according to various embodiments of the present disclosure which will be described below may include, for example, at least one of a wearable device, a smartphone, a tablet PC, a mobile phone, a video phone, an electronic book reader, a desktop computer, a laptop computer, a netbook computer, a workstation, a server, a PDA, a portable multimedia player (PMP), an MP3 player, a medical device, and a camera. The wearable device may include at least one of an accessory type wearable device (e.g., wristwatch, ring, bracelet, anklet, necklace, glasses, contact lens, or head mounted device (HMD)), a textile/clothing type wearable device (e.g., electronic clothing), a body-mounted type wearable device (e.g., skin pad or tattoo), and a body implantable type wearable device. However, the wearable device is not limited thereto and may include, for example, various portable medical measuring devices (antioxidant measuring device, blood glucose monitor, heart rate monitor, blood pressure measuring device, thermometer, etc.), magnetic resonance angiography (MRA), magnetic resonance imaging (MRI), computed tomography (CT), imaging system, ultrasonic system, etc.), and the like. However, the electronic device is not limited to the above devices.

Figure 2:
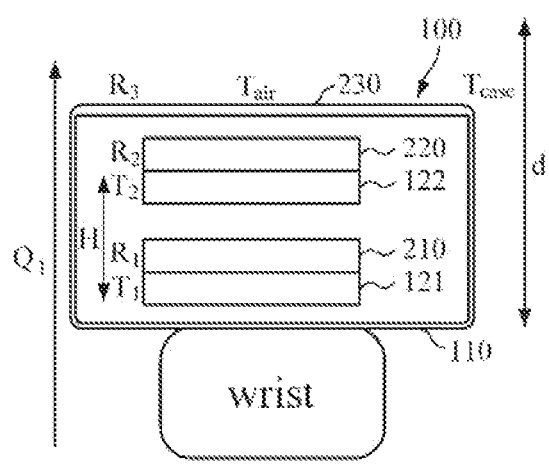
FIG. 2 is a diagram illustrating an example of a structure of an electronic device.

FIG. 1 is a block diagram illustrating an electronic device according to an embodiment of the present disclosure. FIG. 2 is a diagram illustrating an example of a structure of an electronic device.

Referring to FIG. 1, an electronic device 100 may include a sensor 120 and a processor 130 which are disposed in a main body 110 of the electronic device 100. The sensor 120 may include a plurality of temperature sensors to obtain temperature data for estimating human body microclimate temperature, and the processor 130 may estimate the human body microclimate temperature by using the temperature data obtained by the sensor 120.

In this case, the human body microclimate temperature ($\mu T$) refers to temperature of the air surrounding the body of a user, which affects thermal comfort felt by the user, and may be defined as temperature of a body part at which radiant heat of the human body interacts with the environment. Particularly, the human body microclimate temperature refers to temperature related to thermal comfort which is the expression of a user's satisfaction with the current temperature, and is evaluated based on thermal sensation that refers to the human thermal sense of feeling hot or cold at ambient temperature, or different thermal preferences for each individual.

In a case in which a body part (e.g., skin) is covered with clothing or bedding, the human body microclimate temperature may refer to the temperature of an air layer between the skin and the clothing or bedding. When skin is exposed outside, the human body microclimate temperature may refer to the temperature in a thermal boundary layer (TBL) in which heat exchange between the environment and the body occurs. The TBL is a region where 99% of heat flux occurs because of a temperature difference between atmospheric temperature and a surface of an object. In an indoor environment with no wind, the TBL in natural convection may extend to a distance of about 2 cm to 5 cm from the body surface.

That is, the human body microclimate temperature may refer to temperature of the air surrounding the body at a distance of approximately 5 cm from the body surface. This distance corresponds to a range of the thermal effect of the human body, on the environment in the absence of convection. If the distance is greater than 5 cm, the human body microclimate temperature may be considered the same as a common ambient temperature or atmospheric temperature.

The sensor 120 may include a first temperature sensor 121 for measuring a first temperature and a second temperature sensor 122 for measuring a second temperature, and the first temperature sensor 121 and the second temperature sensor 122 may be disposed at different positions in the main body 110. For example, the first temperature sensor 121 may be disposed at a vertical distance of 10 mm or less from a lower surface of the main body 110, e.g., from a contact surface between the main body 110 and a user's wrist; the second temperature sensor 122 may be disposed at a vertical distance of 10 mm or less below the upper surface of the main body 110. The first temperature sensor 121 may be disposed as close as possible to the contact surface, and the second temperature sensor 112 may be disposed as close as possible to, for example, a display panel of the wearable device to estimate the accurate human body microclimate temperature.

In another example, the first temperature sensor 121 and the second temperature sensor 122 may be disposed to face each other in a straight line in a thickness direction of the main body 110. Further, the first temperature sensor 121 and the second temperature sensor 122 may be attached to a structure (e.g., main board) in the main body 110, and may be disposed at positions spaced apart from each other. However, the arrangement of the first temperature sensor 121 and the second temperature sensor 122 is not limited thereto. In this case, the first temperature sensor 121 and/or the second temperature sensor 122 may be a contact type temperature sensor including a thermistor, and may include a temperature sensor such as a digital temperature sensor, thermopile, and the like. The type of temperature sensor is not limited thereto.

Referring to FIG. 2, the second temperature sensor 122 may be disposed above the first temperature sensor 121. In addition, a first thermally insulating material 210 may be disposed at an upper end of the first temperature sensor 121, which is a portion between the first temperature sensor 121 and the second temperature sensor 122. Similarly, a second thermally insulating material 220 may be disposed at an upper end of the second temperature sensor 122. The first thermally insulating material 210 and/or the second thermally insulating material 220 may be a material such as polyurethane foam or any insulator that has a thermal conductivity of 0.1 W/mK or less.

In one embodiment, the first temperature sensor 121 and the second temperature sensor 122 may be separated by a space therebetween, and the second temperature sensor 122 may be spaced apart from the upper surface. The space may be completely or partially filled with the thermally insulating materials 210 and 220. For example, in the case where the thermally insulating materials 210 and 220 partially fill the space between the first temperature sensor 121 and the second temperature sensor 122 or the space between the second temperature sensor 122 and the upper surface of the main body 110, air may be present between the first thermally insulating material 210 and the second temperature sensor 122 and/or between the second thermally insulating material 220 and the upper surface of the main body 110. In this case, the air and the thermally insulating materials 210 and 220 may act together as an insulator. Further, the first thermally insulating material 210 and the second thermally insulating material 220 may be air, and for example, the space between the first temperature sensor 121 and the second temperature sensor 122 and the space between the second temperature sensor 122 and the surface of the main body 110 may be filled with air.

The first temperature sensor 121, the second temperature sensor 122, and thermally insulating materials 210 and 220 may be disposed in a region between a lower contact surface of the main body 110 and a display panel of the electronic device 100.

If the electronic device 100 is implemented as a smartwatch, there may be constraints on the height of the temperature sensors 121 and 122 and the distance between the temperature sensors 121 and 122, due to the limited space available for accommodating the temperature sensors 121 and 122.

The distance between the temperature sensors 121 and 122 may correspond to a thickness of the thermally insulating material 210 when the space between the temperature sensors 121 and 122 is completely filled with the thermally insulating material 210. For example, a region of the smartwatch, in which the temperature sensors 121 and 122 are accommodated, may have a height of 1 mm to 1.5 mm.

Due to the limited space available in the smartwatch, the height of the thermally insulating material 210 may need to decrease as the height of the temperature sensors 121 and 122 increases. However, in order to obtain a minimum temperature difference (e.g., 0.3° C.) between the two temperature sensors 121 and 122 to estimate the human body microclimate temperature based on the temperature difference, the distance between the two temperature sensors 121 and 122 is required to be constant.

The temperature sensors 121 and 122 may have a slight error (e.g., with an error rate of ±0.1° C.) such that if a difference in target temperatures measured by the two temperature sensors 121 and 122 is less than 0.3° C., the temperature difference between two temperature sensors 121 and 122 may not be measured with reliable accuracy.

Based on the above understanding, a minimum target temperature difference, measured by the two temperature sensors 121 and 122, may be set to 0.3° C., and a heat transfer simulation thereof may be performed as shown in Table 1 below. That is, the heat transfer simulation may be performed by changing heights of the temperature sensors 121 and 122 and a height of the thermally insulating material 210 (or a distance between the temperature sensors 121 and 122 when the space between the temperature sensors 121 and 122 is not completely filled with the thermally insulating material 210) for each of a plurality of region height H.

TABLE 1

| Region height (H) | Height of temperature sensor | Height of thermally insulating material (or distance between temperature sensors) | Temperature difference |
|---|---|---|---|
| 1 mm | 0.1 | 0.8 | 0.648 |
| | 0.2 | 0.6 | 0.486 |
| | 0.3 | 0.4 | 0.324 |
| | 0.4 | 0.2 | 0.162 |
| 1.1 mm | 0.1 | 0.9 | 0.730 |
| | 0.2 | 0.7 | 0.567 |
| | 0.3 | 0.5 | 0.405 |
| | 0.4 | 0.3 | 0.243 |
| 1.2 mm | 0.1 | 1 | 0.811 |
| | 0.2 | 0.8 | 0.648 |
| | 0.3 | 0.6 | 0.486 |
| | 0.4 | 0.4 | 0.324 |
| | 0.5 | 0.2 | 0.162 |
| 1.3 mm | 0.1 | 1.1 | 0.892 |
| | 0.2 | 0.9 | 0.730 |
| | 0.3 | 0.7 | 0.567 |
| | 0.4 | 0.5 | 0.405 |
| | 0.5 | 0.3 | 0.243 |
| 1.4 mm | 0.1 | 1.2 | 0.973 |
| | 0.2 | 1 | 0.811 |
| | 0.3 | 0.8 | 0.648 |
| | 0.4 | 0.6 | 0.486 |
| | 0.5 | 0.4 | 0.324 |
| | 0.6 | 0.2 | 0.162 |
| 1.5 mm | 0.1 | 1.3 | 1.054 |
| | 0.2 | 1.1 | 0.892 |
| | 0.3 | 0.9 | 0.730 |
| | 0.4 | 0.7 | 0.567 |
| | 0.5 | 0.5 | 0.405 |
| | 0.6 | 0.3 | 0.243 |

Referring to the above Table 1, if the target temperature difference measured by the two temperature sensors 121 and 122 is 0.3° C. or above, the height of the respective temperature sensors 121 and 122 may be set to 0.3 mm minimum (i.e., greater than or equal to 0.3 mm, preferably in a range of from 0.3 mm to 0.5 mm), and the height of the thermally insulating material 210 may be set to 0.4 mm minimum (i.e., greater than or equal to 0.4 mm, preferably in a range of from 0.4 mm to 1.3 mm).

The main body 110 may be of a wearable type which may be worn on a user's body part (e.g., wrist), and may be a smartphone type device which may be carried by a user.

The processor 130 may estimate the human body microclimate temperature related to thermal comfort felt by a user, based on a difference between the first temperature, measured by the first temperature sensor 121, and the second temperature measured by the second temperature sensor 122 while the main body 110 is worn on the user's body part or the user carries the main body 110.

First, the processor 130 may estimate heat flux based on the difference between the first temperature and the second temperature.

Generally, when considering heat flow as a current, a heat transfer property of a material can be understood as the resistance of the material, and a heat flux as a voltage. In this context, an equation that follows Ohm's law (V=IR) can be used to express the flow of heat. For example, if heat is being transferred from the wrist to the top of the main body in a series circuit and the heat flux therein is $Q_1$, a temperature difference between the first temperature $T_1$ and the second temperature $T_2$, a temperature difference between the second temperature $T_2$ and the temperature $T_{case}$ of the upper surface of the main body, and a temperature difference between the temperature $T_{case}$ of the upper surface of the main body and air temperature $T_{air}$ at the top of the main body may be estimated as the same heat flux $Q_1$. In this case, as for the flow of heat at the inner portion and the top of the main body 110, the following Equation 1 may be derived based on Ohm's law (V=IR).

$$\frac{T_{case} - T_{air}}{R_3} = \frac{T_2 - T_{case}}{R_2} = \frac{T_1 - T_2}{R_1} \quad \text{[Equation 1]}$$

Herein, $R_1$ denotes a resistance value of the first thermally insulating material 210, $R_2$ denotes a resistance value of the second thermally insulating material 220, and $R_3$ denotes a resistance value of an upper surface 230 of the main body.

Then, the processor 130 may estimate the human body microclimate temperature by combining a result, obtained by applying a first correction factor to the estimated heat flux, with the second temperature.

For example, the processor 130 may determine the first correction factor so that the human body microclimate temperature may be set as a value between a temperature at a first distance from a body surface (e.g., a contact surface of a wearable device which is contacted with the body surface) and a temperature at a second distance from the body surface. In this case, the processor 130 may determine the first correction factor to be a value between a second correction factor for calculating the temperature at the first distance from the body surface and the third correction factor for calculating the temperature at the second distance from the body surface.

For example, when the height of the main body is 1 cm, the first distance may be a distance (e.g., d=1 cm) from the body surface to the upper surface of the main body, such that the temperature at the first distance from the body surface may be the temperature of the upper surface of the main body. In addition, the second distance may be a distance of 5 cm or less (e.g., d=5 cm) from the body surface, for example, a vertical distance in a range of from 3 cm to 4 cm from the upper surface of the main body, such that the temperature at the second distance may be a temperature at a distance corresponding to a vertical distance in a range of from 3 cm to 4 cm from the upper surface of the main body. However, the first distance and the second distance are not limited thereto.

The above Equation 1 may be divided into the following two separate Equations 2 and 3.

$$\frac{T_{case} - T_{air}}{R_3} = \frac{T_2 - T_{case}}{R_2} \quad \text{[Equation 2]}$$

$$\frac{T_2 - T_{case}}{R_2} = \frac{T_1 - T_2}{R_1} \quad \text{[Equation 3]}$$

In this case, the temperature at the first distance (e.g., d=1 cm) may be represented by the following Equation 4 by using Equations 2 and 3.

$$T_{air(d=1)} = T_{case} = T_2 - \frac{R_2}{R_1}(T_1 - T_2) = T_2 - \alpha_1(T_1 - T_2) \quad \text{[Equation 4]}$$

Further, the temperature at the second distance (e.g., d=5 cm) may be represented by the following Equation 5 by using Equations 2 and 3.

$$T_{air(d=5)} = T_2 - \frac{R_2 + R_3}{R_1}(T_1 - T_2) = T_2 - \alpha_2(T_1 - T_2) \quad \text{[Equation 5]}$$

Herein, $T_{air(d=1)}$ denotes the temperature at the first distance, $T_{air(d=5)}$ denotes the temperature at the second distance, and $\alpha_1$ and $\alpha_2$ denote the second correction factor and the third correction factor. For example, the processor 130 may calculate the second correction factor $\alpha_1$ based on the resistance value $R_1$ of the first thermally insulating material and the resistance value $R_2$ of the second thermally insulating material. The processor 130 may calculate the third correction factor $\alpha_2$ based on the resistance value $R_1$ of the first thermally insulating material, the resistance value $R_2$ of the second thermally insulating material, and the resistance value $R_3$ of air of the upper surface of the main body.

In another example, the processor 130 may also estimate heat flux by using a difference between the first temperature and the second temperature. For example, the processor 130 may determine the heat flux, corresponding to the difference between the first temperature and the second temperature, by using a prestored model that defines a relationship between the heat flux and the difference between the first temperature and the second temperature.

The processor 130 may finally estimate the human body microclimate temperature by combining a result, obtained by applying the first correction factor to the heat flux estimated based on the difference between the first temperature and the second temperature, with the second temperature, and the estimated human body microclimate temperature may be represented by the following Equation 6. In this case, the processor 130 may determine the first correction factor so that the human body microclimate temperature may be a value $T_{air(d=5)} < \mu T < T_{air(d=1)}$ between the temperature at the first distance and the temperature at the second distance. To this end, the processor 130 may determine, as the first correction factor, a value between the calculated second and third correction factors.

$$\mu T = T_2 - \beta(T_1 - T_2), \text{ where } \alpha_1 < \beta < \alpha_2 \quad \text{[Equation 6]}$$

Herein, $\mu T$ denotes the human body microclimate temperature, and $\beta$ denotes the first correction factor.

The processor 130 may determine, as the first correction factor $\beta$, a statistical value (e.g., mean value) of the calculated second correction factor $\alpha_1$ and third correction factor $\alpha_2$, and may also select a value closest to the second correction factor $\alpha_1$ or a value closest to the third correction factor $\alpha_2$ from among predetermined first correction factors $\beta$. The method of determining the first correction factor $\beta$ by the processor 130 is not limited thereto.

In another embodiment, when a body part is covered with clothing or bedding or the like, the human body microclimate temperature may be a temperature in an air layer which is an insulating layer between skin and the clothing or between skin and the bedding. For example, in the case where a main body of an electronic device is covered with clothing or bedding or the like without being exposed to air, the human body microclimate temperature may be determined by estimating temperature in an insulating layer between an upper surface of the main body and a body part covered with clothing or bedding or the like.

Figure 3:
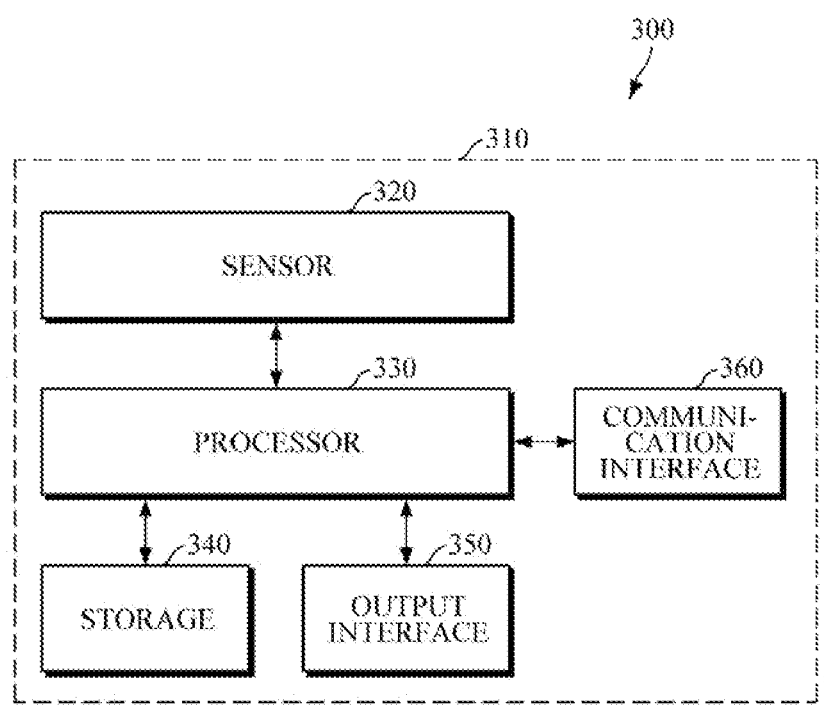
FIG. 3 is a block diagram illustrating an electronic device for estimating human body microclimate temperature according to another embodiment of the present disclosure.

FIG. 3 is a block diagram illustrating an electronic device for estimating human body microclimate temperature according to another embodiment of the present disclosure.

Referring to FIG. 3, an electronic device 300 includes a sensor 320, a processor 330, a storage 340, an output interface 350, and a communication interface 360 which are mounted in a main body 310 of the electronic device 300. The sensor 320 and the processor 330 the same or substantially the same structure as the sensor 120 and the processor 130 in the embodiments of FIGS. 1 and 2, such that a detailed description thereof will be omitted.

The storage 340 may store information related to the human body microclimate temperature. For example, the storage 340 may store temperature data obtained by the sensor 320, resistance values of thermally insulating materials, and processing results of the processor 330, for example, heat flux, estimated human body microclimate temperature values, and the like.

The storage 340 may include a storage medium having at least one type of a flash memory type, a hard disk type, a multimedia card micro type, a card type (for example, a SD memory, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disc, or an optical disc, etc., but is not limited thereto.

The output interface 350 may provide the processing results of the processor 330 to a user.

FIGS. 4A to 4E are diagrams illustrating examples of displaying details about human body microclimate temperature on a display of the electronic device 300 according to an embodiment of the present disclosure.

Figure 4A:
FIGS. 4A to 4E are diagrams illustrating examples of displaying details about human body microclimate temperature on a display of an electronic device according to an embodiment of the present disclosure.
Figure 4B:
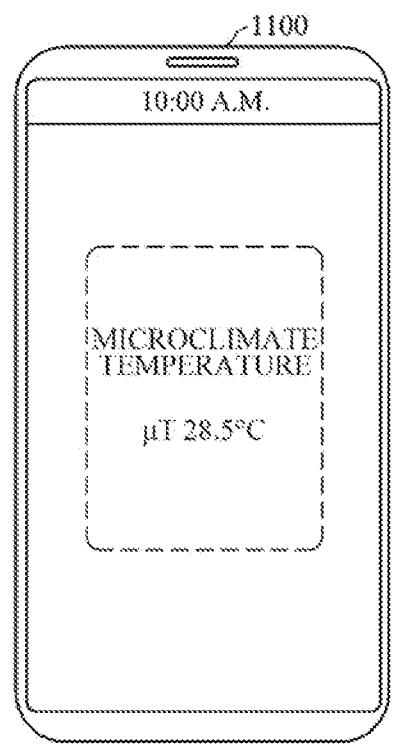
Figure 4C:
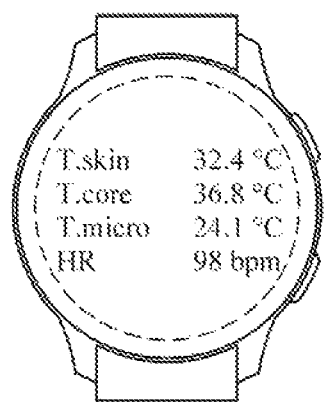

Referring to FIGS. 4A and 4B, the output interface 350 may display a measured human body microclimate temperature value on a display of a smartwatch or a smartphone. The output interface 350 may provide a user with information by changing color, line thickness, etc., so that the user may easily recognize the measured human body microclimate temperature value. In addition, referring to FIG. 4C, the output interface 350 may provide a variety of information to the user by displaying the human body microclimate temperature (T.micro) along with other measured values, such as skin temperature, core body temperature, heart rate, and the like. Further, along with or without the visual display, the output interface 350 may provide the user with guidance information on the human body microclimate temperature in a non-visual manner by voice, vibrations, tactile sensation, and the like using an audio output module such as a speaker and the like, or a haptic module.

In another example, the electronic device 300 may include at least one of a Photoplethysmography (PPG) sensor, an acceleration sensor, a illuminance sensor, and a gyro sensor in addition to the temperature sensor, and the processor 330 determines a user's sleep state based on data obtained by the sensor, and if the user is asleep, the processor 330 may determine a sleep environment based on the human body microclimate temperature measured during sleep. In addition, the processor 330 may output a result of the determined sleep environment through the output interface 350, and may provide the user with health guidance on sleep.

For example, the processor 330 may determine a user's sleep state based on the user's motion measured by the gyro sensor, and upon determining that the user is asleep, the processor 330 may continuously estimate the human body microclimate temperature and may display an estimation result on the display through the output interface 350.

Figure 4D:
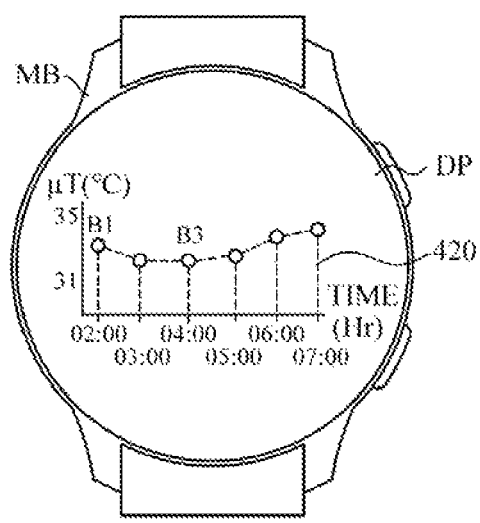
Figure 4E:

Referring to FIG. 4D, for example, if the human body microclimate temperature is automatically measured on an hourly basis while the user is asleep at night, the processor 330 may display a measurement result in a visual graph 420. In this case, if the user selects a graphic object BI in the graph 420, the processor 330 may display an estimated human body microclimate temperature value at a corresponding time (e.g., 2:00 a.m.) on a separate display screen, and if the user selects a graphic object B3, the processor 330 may display an estimated human body microclimate temperature value at a corresponding time (e.g., 4:00 a.m.) on a separate display screen.

In another embodiment, if values estimated continuously during sleep fall outside a predetermined human body microclimate temperature range (e.g., a range of 31° C. to 35° C.) that is suitable for sleep, the processor 330 may determine that a sleep environment is poor, and may display information on a time period, during which the values fall outside the temperature range, on a display DP and may provide a user with the information by using text, voice, and the like.

The processor 330 may output a result of the sleep environment. In addition, the processor 330 may provide the user with health guidance on sleep based on the result of the sleep environment.

If the human body microclimate temperature falls outside a range of 31° C. to 35° C. for a period of four hours or more in a total 8 hours of sleep, the processor 330 may determine that the sleep environment is poor, and may output a result of the poor sleep environment on the display DP. Further, referring to FIG. 4E, the processor may provide a user with health guidance on sleep by outputting a text 430, "last night's sleep environment was not good. Please keep the indoor temperature at 26° C. during sleep," on the display. However, the above example is merely for convenience of explanation, and the present disclosure is not limited thereto.

In yet another example, the processor 330 may measure skin temperature during sleep by using the human body microclimate temperature. For example, the processor 330 may measure the skin temperature during sleep and may use the measured skin temperature as basal body temperature, and may estimate the skin temperature and body temperature with improved accuracy by using the human body microclimate temperature.

Figure 5A:
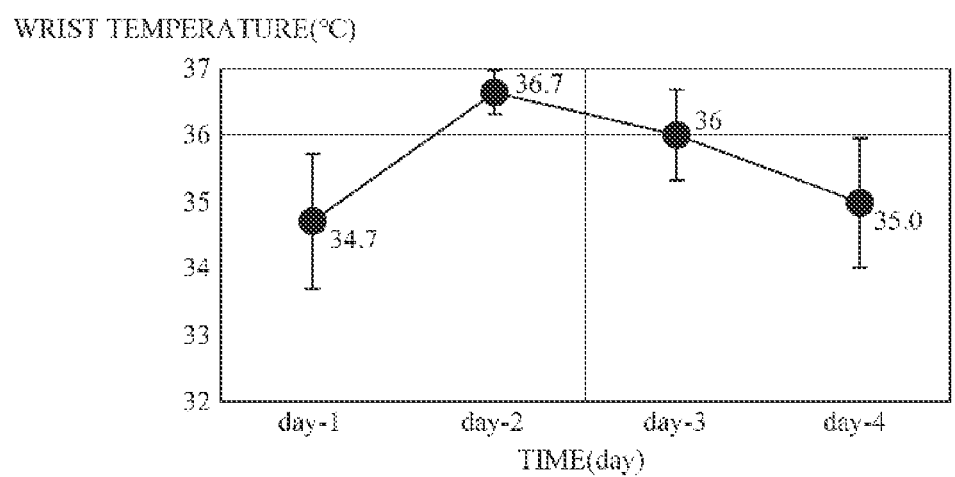
FIGS. 5A and 5B are diagrams illustrating an example of using human body microclimate temperature during measurement of skin temperature.
Figure 5B:
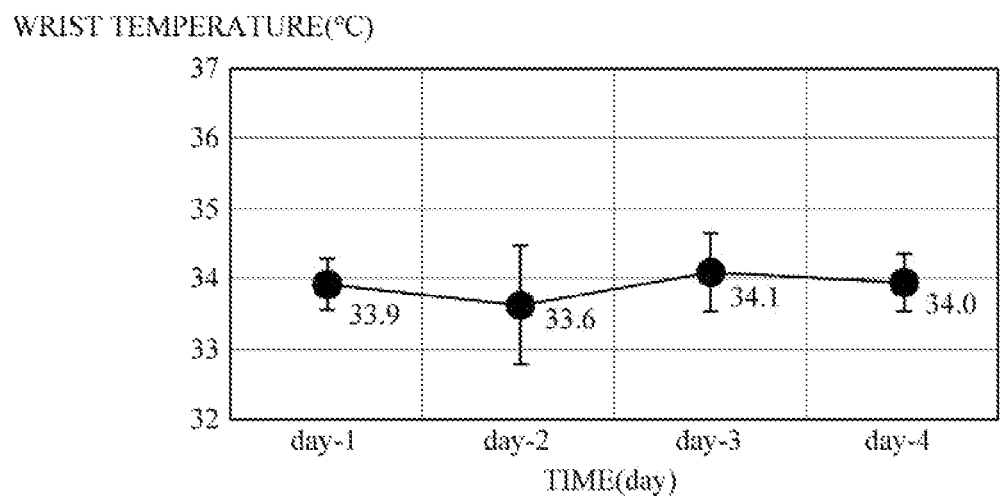

FIGS. 5A and 5B are diagrams illustrating an example of using human body microclimate temperature during measurement of skin temperature.

FIG. 5A is a graph of daily means of skin temperatures (e.g., wrist temperature) during sleep which are measured by a wearable device. Referring to FIG. 5A, the graph illustrates a significant deviation of about 2° C. between the daily means of skin temperatures. This deviation can be attributed to the fact that the skin temperature is greatly affected by ambient temperature or environment during measurement of the skin temperature, thereby resulting in a large skin temperature deviation. For example, if a user continuously measures skin temperature while wearing a smartwatch during sleep, the user's wrist may be positioned inside or outside of bedding, such that the human body microclimate temperature may change and the like, and the skin temperature may be measured with a relatively large error compared to skin temperature to be originally measured.

FIG. 5B is a graph of daily means of skin temperatures during sleep which are measured by a wearable device in the case where a human body microclimate temperature is maintained at a constant level within a predetermined range (e.g., a range of 30° C. to 32° C.). Referring to FIG. 5B, it can be seen that there is a small deviation of about 1° C. or less between the daily means of skin temperatures measured for the same object as FIG. 5A. This is because the skin temperatures are measured in a constant environmental condition in which the human body microclimate temperature range is limited to a predetermined range. For example, the processor 330 may estimate the human body microclimate temperature and may determine that a time period, during which the human body microclimate temperature is within the predetermined range, is suitable for skin temperature measurement, and may measure skin temperatures during the time period and may estimate a daily mean of skin temperatures during sleep based on the measured skin temperatures.

Referring back to FIG. 3, the communication interface 360 may enable communication with an external device to transmit and receive various data related to estimating the human body microclimate temperature. The external device may include an information processing device, such as a smartphone, a tablet PC, a desktop computer, a laptop computer, and the like. For example, the communication interface 360 may transmit a human body microclimate temperature measurement result to the external device, such as a smartphone and the like, and a user may monitor the human body microclimate temperature over time by using the smartphone.

The communication interface 360 may communicate with the external device by using various wired and wireless communication techniques including Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, 5G, and 6G communications, and the like. However, the communication techniques are not limited thereto.

Figure 6:
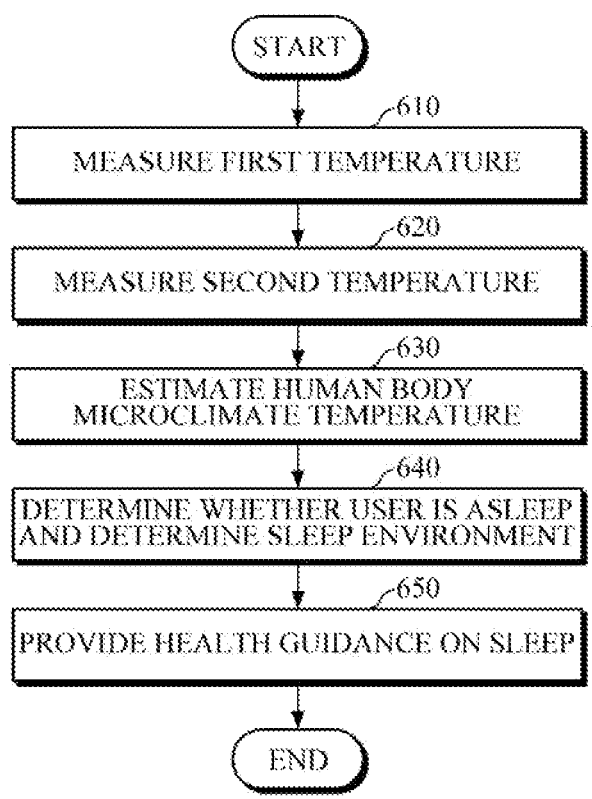
FIG. 6 is a flowchart illustrating a method of estimating human body microclimate temperature according to an embodiment of the present disclosure.

FIG. 6 is a flowchart illustrating a method of estimating human body microclimate temperature according to an embodiment of the present disclosure.

The method of FIG. 6 is an example of a method of estimating human body microclimate temperature performed by the electronic device 100 according to the embodiments of FIGS. 1 and 2, which are described above, and thus will be briefly described below in order to avoid redundancy.

Referring to FIG. 6, the electronic device may first measure a first temperature in operation 610 by using the first temperature sensor in the main body, and may measure a second temperature in operation 620 by using the second temperature sensor disposed at a different position from the first temperature sensor.

Then, the electronic device may estimate human body microclimate temperature related to thermal comfort felt by a user, based on a difference between the first temperature and the second temperature in operation 630. For example, the electronic device may estimate heat flux based on the difference between the first temperature and the second temperature. In addition, the electronic device may estimate the human body microclimate temperature by combining a result, obtained by applying a first correction factor to the estimated heat flux, with the second temperature.

The electronic device may determine the first correction factor so that the human body microclimate temperature may be set as a value between a temperature at a first distance from a surface of the main body and a temperature at a second distance from the surface of the main body, and the first correction factor may be determined as a value between a second correction factor for calculating the temperature at the first distance from the surface of the main body and a third correction factor for calculating the temperature at the second distance from the surface of the main body. If the height of the main body is 1 cm, the first distance may be a distance (e.g., d=1 cm) from a body surface to an upper surface of the main body, and the second distance may be a distance of 5 cm or less (e.g., d=5 cm) from the body surface, for example, a vertical distance in a range of from 3 cm to 4 cm from the upper surface of the main body.

Subsequently, the electronic device may determine whether a user is asleep based on data obtained by at least one of a PPG sensor, an acceleration sensor, a illuminance sensor, a Global Positioning System (GPS), and a gyro sensor, and upon determining that the user is asleep, the processor 330 may determine a sleep environment based on the human body microclimate temperature measured during sleep in operation 640. Then, the electronic device may output a result of the determined sleep environment through the output interface, and may provide the user with health guidance on sleep in operation 650.

For example, the electronic device may use the gyro sensor to measure the user's motion and determine whether a user is asleep based on the user's motion. Once the user is determined to be asleep, the processor 330 may continuously estimate the human body microclimate temperature and may display an estimation result on the display through the output interface. In addition, if values estimated continuously during sleep fall outside a predetermined human body microclimate temperature range (e.g., a range of 31° C. to 35° C.) that is suitable for sleep, the electronic device may determine that a sleep environment is poor, and may display information on a time period, during which the values fall outside the temperature range, on the display and may provide a user with the information by using text, voice, and the like. Further, in one embodiment, the electronic device may provide a user with guidance on sleep by outputting the text 430, "last night's sleep environment was not good. Please keep the indoor temperature at 26° C. during sleep," on the display. However, the above example is merely for convenience of explanation, and the present disclosure is not limited thereto.

FIGS. 7 to 11 are diagrams illustrating examples of structures of an electronic device including an apparatus for estimating human body microclimate temperature. Examples of the electronic device may include not only a smartwatch, but also a smartphone, a smart band, smart glasses, a smart necklace, and an ear-wearable device, but the electronic device is not limited thereto.

Figure 7:
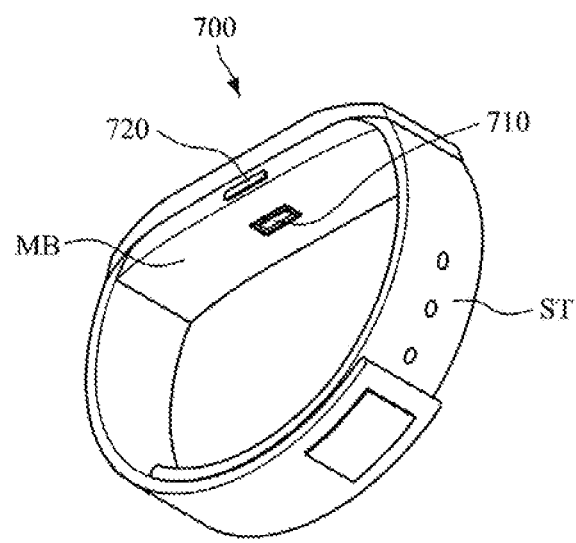
FIGS. 7 to 11 are diagrams illustrating examples of structures of an electronic device including an apparatus for estimating human body microclimate temperature.

Referring to FIG. 7, the electronic device may be implemented as a smart watch-type wearable device 700 which includes a main body MB and a wrist strap ST.

The main body MB may be formed in various shapes. A battery may be embedded in the main body MB and/or the strap ST to supply power to various components of the wearable device. The strap ST may be connected to both ends of the main body to allow the main body to be worn on a user's wrist, and may be flexible so as to be wrapped around the user's wrist. The strap ST may be composed of a first strap and a second strap which are separated from each other. One ends of the first strap and the second strap are connected to both sides of the main body MB, and the other ends thereof may be connected to each other via a fastening means. In this case, the connecting means may be formed as magnetic fastening, Velcro fastening, pin fastening, and the like, but is not limited thereto. Further, the strap ST is not limited thereto, and may be integrally formed as a non-detachable band.

The main body MB may include a sensor 710, a processor, a display, an output interface, a storage, and a communication interface. However, depending on the size and shape of a form factor and the like, some of the display, the storage, and the communication interface may be omitted.

A manipulator 720 may be formed on a side surface of the main body MB, as illustrated herein. The manipulator 720 may receive a user command and may transmit the received command to the processor. In addition, the manipulator 720 may have a power button to turn on/off the wearable device 700.

The sensor 710 may include temperature sensors disposed at different positions and attached to a structure in the main body. In addition, at least one of the plurality of temperature sensors may be a thermistor which is a contact type temperature sensor.

The processor mounted in the main body MB may be electrically connected to various components as well as the sensor 710. For example, while the strap is wrapped around a user's wrist and the main body is worn on the wrist, the processor may estimate human body microclimate temperature related to thermal comfort felt by a user, based on a difference between a first temperature and a second temperature. In this case, the processor may estimate heat flux based on the difference between the first temperature and the second temperature, and may estimate the human body microclimate temperature by combining a result, obtained by applying a first correction factor to the estimated heat flux, with the second temperature.

In addition, the processor may control a target temperature of an Internet of Things (IOT) device based on the estimated human body microclimate temperature. In this case, the communication interface may transmit a control signal for controlling the target temperature of the IoT device, and may receive a current ambient temperature from the IoT device.

Figure 8:
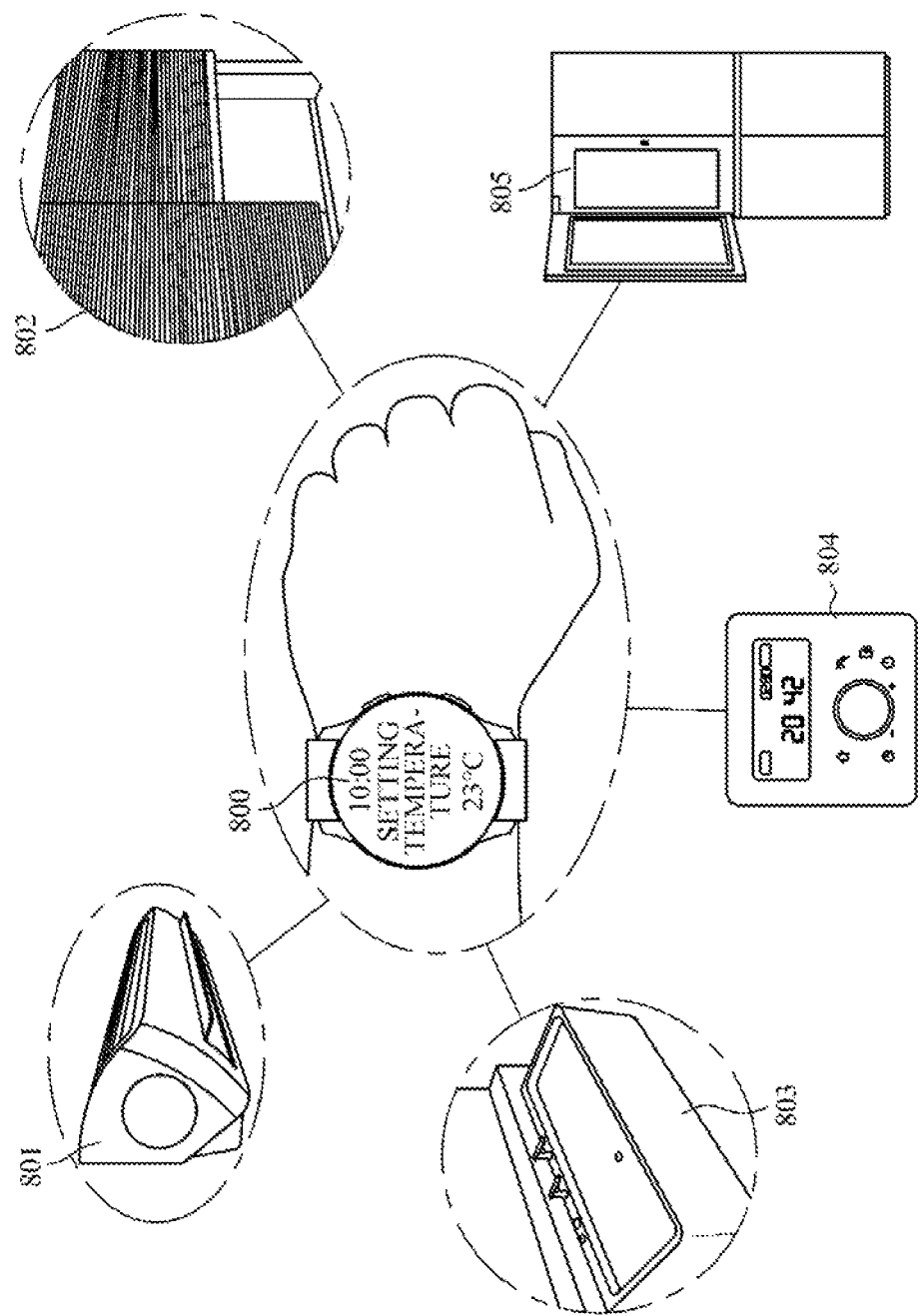

FIG. 8 is a diagram illustrating an example controlling Internet of Things (IOT) devices by a smartwatch-type wearable device 800.

Referring to FIG. 8, the wearable device 800 may include a main body and a wrist strap. A display is provided on a front surface of the main body, and may display various application screens, including time information, received message information, IoT information, human body microclimate temperature information, target ambient temperature information, and the like. A sensor may be disposed on a rear surface of the main body. The sensor may include a plurality of temperature sensors spaced apart from each other and disposed at different distances from a contact surface with the wrist. In addition, the sensor may include various other sensors including a PPG sensor and the like. A processor, a communication interface, a storage, and various other components may be disposed in a main body case.

Referring to FIG. 8, the wearable device 800 may control IoT devices, e.g., a target temperature of an air-conditioner 801, a target illuminance of an illumination device 802, a water temperature of a bathtub 803, heating of a heating device 804, a water temperature of a water purifier 805, etc., through the communication interface based on the estimated human body microclimate temperature. In this case, a set human body microclimate temperature of a user, target ambient temperature information, and controlled IoT device information (e.g., image of the IoT, current ambient temperature, etc.) may be displayed on the display. Further, the wearable device 800 may receive the current ambient temperature, current illuminance, current water temperature, and the like from the IoT device through the communication interface.

Figure 9:
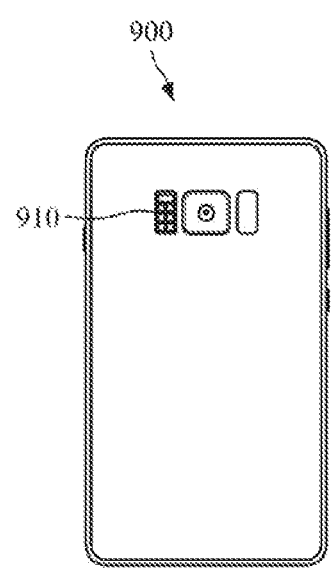

Referring to FIG. 9, the electronic device may be implemented as a mobile device 900 such as a smartphone.

The mobile device 900 may include a housing and a display panel. The housing may form an outer appearance of the mobile device 900. The housing has a first surface, on which a display panel and a cover glass may be disposed sequentially, and the display panel may be exposed to the outside through the cover glass. A sensor 910, a camera module and/or an infrared sensor, and the like may be disposed on a second surface of the housing.

For example, a plurality of temperature sensors for obtaining data from a user may be disposed on a rear surface of the mobile device 900, and a fingerprint sensor disposed on the front surface thereof, a power button or a volume button disposed on a side surface thereof, sensors disposed on other positions of the front and rear surfaces thereof, and the like may be provided to estimate human body microclimate temperature.

In addition, when a user transmits a request for estimating the human body microclimate temperature by executing an application and the like installed in the mobile device 900, the mobile device 900 may obtain data by using the sensor 910, and may measure the human body microclimate temperature and may provide the user with the measured value and guidance information related to the human body microclimate temperature through a display by using the processor in the mobile device 900.

Figure 10:
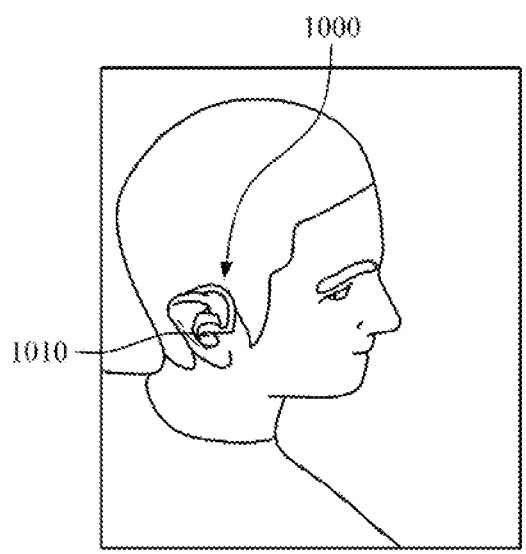

Referring to FIG. 10, the electronic device may also be implemented as an ear-wearable device 1000.

The ear-wearable device 1000 may include a main body and an ear strap. A user may wear the ear-wearable device 1000 by hanging the ear strap on the user's auricle. The ear strap may be omitted depending on the shape of ear-wearable device 1000. The main body may be inserted into the external auditory meatus. A sensor 1010 may be mounted in the main body. The ear-wearable device 1000 may provide a user with a human body microclimate temperature measurement result and/or human body microclimate temperature guidance information as sound, or may transmit the information to an external device, e.g., a mobile device, a tablet PC, a personal computer, etc., through a communication module provided in the main body.

Figure 11:
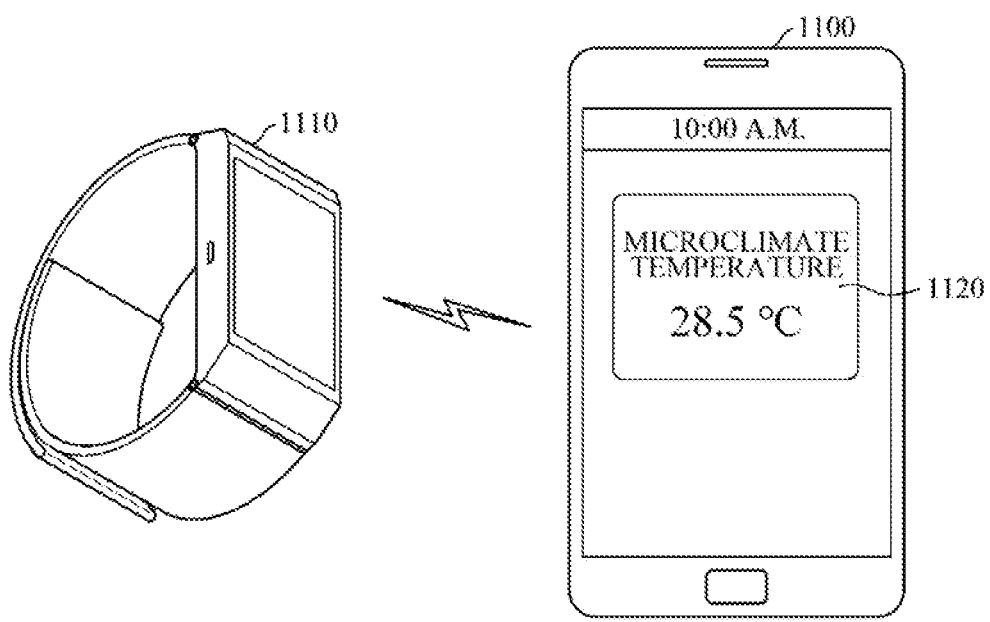

Referring to FIG. 11, the electronic device may be implemented as a combination of a wristwatch-type wearable device and a smartphone. For example, a processor for estimating human body microclimate temperature may be mounted in a main body of the smartphone 1100. Upon receiving a request for measuring human body microclimate temperature, the processor of the smartphone 1100 may control a communication interface to communicate with a communication module, mounted in a main body of a wearable device 1110, to obtain data. Further, upon receiving temperature data from the wearable device 1110, the processor may estimate the human body microclimate temperature, and may output a message 1120, "human body microclimate temperature is 28.5° C.," on a display of the smartphone 1100, as illustrated herein.

In another embodiment, one or more temperature sensors for measuring human body microclimate temperature may be disposed on the outside of an electronic device.

Figure 12:
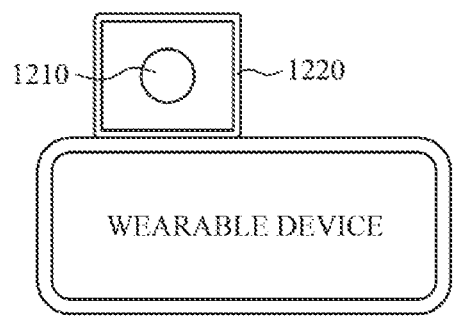
FIG. 12 is a diagram illustrating an example of estimating human body microclimate temperature using a temperature sensor disposed on the outside of an electronic device.

FIG. 12 is a diagram illustrating an example of estimating human body microclimate temperature using a temperature sensor disposed on the outside of an electronic device.

Referring to FIG. 12, the human body microclimate temperature may be estimated by directly providing a temperature sensor 1210 on an outer surface of an electronic device without providing temperature sensors inside the electronic device. In this case, the temperature sensor 1210 may be attached to the surface of a main body so as to measure temperature at a distance of 3 cm to 4 cm from an upper surface of the main body. A housing 1220 covering the temperature sensor 1210 may be made of a material with low thermal conductivity, and may have a structure that allows for effective ventilation. In addition, contact between the housing 1220 and the temperature sensor 1210 may be minimized in order to minimize error in estimating the human body microclimate temperature caused by heat transfer.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled.

What is claimed is:

1. An electronic device comprising:
 a main body comprising:
  a first temperature sensor configured to measure a first temperature at a first distance from a rear surface of the main body;
  a second temperature sensor configured to measure a second temperature at a second distance from the rear surface of the main body;
  a first thermally insulating material disposed between the first temperature sensor and the second temperature sensor;
  a second thermally insulating material disposed between the second temperature sensor and a front surface of the main body, and
 a processor configured to, while the main body is worn on a user or is carried by the user;
  estimate a heat flux based on a difference between the first temperature and the second temperature;
  set a first correction factor to a value between a second correction factor and a third correction factor, wherein the second correction factor is calculated based on a resistance value of the first thermally insulating material and a resistance value of the second thermally insulating material, and the third correction factor is calculated based on the resistance value of the first thermally insulating material, the resistance value of the second thermally insulating material, and an air resistance value of the front surface of the main body;

obtain a corrected heat flux by applying the first correction factor to the estimated heat flux; and estimate a microclimate temperature around a body of the user by combining the corrected heat flux with the second temperature.

2. The electronic device of claim 1, wherein the first temperature sensor is disposed at a vertical distance of 10 mm or less from the rear surface of the main body.

3. The electronic device of claim 1, wherein the second temperature sensor is disposed at a vertical distance of 10 mm or less below the front surface of the main body.

4. The electronic device of claim 1, wherein the first temperature is a temperature of the rear surface of the main body, and the second temperature is a temperature at a vertical distance in a range of from 3 cm to 4 cm above the rear surface of the main body.

5. The electronic device of claim 1, wherein at least one of the first temperature sensor and the second temperature sensor is a contact type temperature sensor.

6. The electronic device of claim 1, wherein the processor is further configured to:

determine a sleep state of the user based on data obtained by at least one of a photoplethysmography (PPG) sensor, an acceleration sensor, an illuminance sensor, and a gyro sensor; and determine a sleep environment based on the microclimate temperature measured during sleep.

7. The electronic device of claim 6, wherein the processor is further configured to output a result of the determined sleep environment through an output interface.

8. A method of estimating human body microclimate temperature by an electronic device, the electronic device comprising a first temperature sensor, a second temperature sensor, a first thermally insulating material disposed between the first temperature sensor and the second temperature sensor, a second thermally insulating material disposed between the second temperature sensor and a front surface of a main body of the electronic device, the method comprising:

by the first temperature sensor included in the main body of the electronic device, measuring a first temperature at a first distance from a rear surface of the main body;

by the second temperature sensor disposed in the main body, measuring a second temperature at a second distance from the rear surface of the main body;

estimate a heat flux based on a difference between the first temperature and the second temperature;

setting a first correction factor to a value between a second correction factor and a third correction factor, wherein the second correction factor is calculated based on a resistance value of the first thermally insulating material and a resistance value of the second thermally insulating material, and the third correction factor is calculated based on the resistance value of the first thermally insulating material, the resistance value of the second thermally insulating material, and an air resistance value of the front surface of the main body;

obtaining a corrected heat flux by applying the first correction factor to the estimated heat flux;

estimating a microclimate temperature around a body of a user by combining the corrected heat flux with the second temperature.

9. The method of claim 8, further comprising:

determining a sleep state of the user based on data obtained by at least one of a photoplethysmography (PPG) sensor, an acceleration sensor, an illuminance sensor, and a gyro sensor; and in response to determining that the user is asleep, determining a sleep environment based on the microclimate temperature measured during sleep.

10. The method of claim 9, further comprising outputting a result of the determined sleep environment through an output interface.

11. A smartwatch comprising:

a main body; and a strap connected to the main body, wherein the main body comprises:

a first temperature sensor configured to measure a first temperature at a first distance from a rear surface of the main body;

a second temperature sensor configured to measure a second temperature at a second distance from the rear surface of the main body;

a first thermally insulating material disposed between the first temperature sensor and the second temperature sensor;

a second thermally insulating material disposed between the second temperature sensor and a front surface of the main body, and a processor configured to, while the main body is worn on a user or is carried by the user:

estimate a heat flux based on a difference between the first temperature and the second temperature;

set a first correction factor to a value between a second correction factor and a third correction factor, wherein the second correction factor is calculated based on a resistance value of the first thermally insulating material and a resistance value of the second thermally insulating material, and the third correction factor is calculated based on the resistance value of the first thermally insulating material, the resistance value of the second thermally insulating material, and an air resistance value of the front surface of the main body;

obtain a corrected heat flux by applying the first correction factor to the estimated heat flux; and estimate a microclimate temperature around a body of the user by combining the corrected heat flux with the second temperature.

12. The smartwatch of claim 11, further comprising a communication interface configured to transmit a control signal for controlling the target temperature of the IoT device, and to receive a current ambient temperature from the IoT device.

\* \* \* \* \*